(12) United States Patent
Ichimoto

(10) Patent No.: US 8,594,872 B2
(45) Date of Patent: Nov. 26, 2013

(54) VEHICULAR CONTROL APPARATUS AND VEHICULAR CONTROL METHOD

(75) Inventor: Kazuhiro Ichimoto, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 13/300,048

(22) Filed: Nov. 18, 2011

(65) Prior Publication Data

US 2012/0130577 A1    May 24, 2012

(30) Foreign Application Priority Data

Nov. 24, 2010   (JP) .................................. 2010-261404

(51) Int. Cl.
   *B60L 9/00*   (2006.01)
(52) U.S. Cl.
   USPC ........................................... 701/22; 903/930
(58) Field of Classification Search
   USPC .............................................. 701/22, 24, 36
   See application file for complete search history.

(56) References Cited

U.S. PATENT DOCUMENTS

2006/0241826 A1* 10/2006 Ishishita et al. ................. 701/22
2011/0320082 A1* 12/2011 Ishishita ......................... 701/22

FOREIGN PATENT DOCUMENTS

| JP | A-2002-345165 | 11/2002 |
| JP | A-2006-172931 | 6/2006 |
| JP | A-2006-067691 | 3/2008 |
| JP | A-2008-155682 | 7/2008 |
| JP | A-2008-271781 | 11/2008 |
| JP | A-2008-284909 | 11/2008 |
| JP | A-2009-051466 | 3/2009 |
| JP | A-2009-262771 | 11/2009 |

OTHER PUBLICATIONS

Japanese Office Action issued in Japanese Application No. 2010-261404 dated Jul. 10, 2012 (w/ partial translation).

* cited by examiner

*Primary Examiner* — John Q Nguyen
*Assistant Examiner* — Jordan S Fei
(74) *Attorney, Agent, or Firm* — Oliff & Berridge, PLC

(57) ABSTRACT

In a vehicular control apparatus mounted on a vehicle including an internal combustion engine, a rotating electrical machine, and a storage device that is supplied with a power from the rotating electrical machine, the vehicle can be decelerated through stoppage of injection of fuel into the internal combustion engine and regenerative braking by the rotating electrical machine. The vehicular control apparatus controls the vehicle such that a remaining capacity in the storage device becomes lower when a catalyst temperature of the internal combustion engine is high than when the catalyst temperature of the internal combustion engine is low.

6 Claims, 9 Drawing Sheets

VEHICULAR CONTROL APPARATUS AND VEHICULAR CONTROL METHOD

INCORPORATION BY REFERENCE

The disclosure of Japanese Patent Application No. 2010-261404 filed on Nov. 24, 2010 including the specification, drawings and abstract is incorporated herein by reference in its entirety.

BACKGROUND OF THE INVENTION

1. Field of the Invention

The invention relates to the control of a hybrid vehicle that is equipped with an internal combustion engine and a rotating electrical machine as motive energy sources.

2. Description of Related Art

There is known a hybrid vehicle that is equipped with an engine and a rotating electrical machine as motive energy sources. In such a hybrid vehicle, a deceleration force may be generated by stopping the supply of fuel to an engine (fuel cut) in decelerating the vehicle. However, when this fuel cut is performed with a three-way catalyst, which is used to purify exhaust gas, at high temperatures, the atmosphere around the catalyst may become excessively rich in oxygen (lean) to promote a deterioration in the catalyst. Thus, it is desirable to reduce the frequency of the performance of fuel cut by decelerating the vehicle through regenerative braking.

For example, according to what is disclosed in Japanese Patent Application Publication No. 2009-051466 (JP-A-2009-051466), in a vehicle that is controlled such that a remaining capacity of a storage device (which will be referred to also as an SOC in the following description) falls within a control range defined by a control upper limit and a control lower limit, the control upper limit of the SOC is raised to absorb a power generated through regenerative braking when the SOC is high and a deterioration in a catalyst is apprehended.

However, when the SOC of the storage device is increased by raising the control upper limit of the SOC as described above, the life of the storage device may be shortened through overcharge. A control apparatus disclosed in the aforementioned publication does not take this problem into account and hence cannot offer a solution.

SUMMARY OF THE INVENTION

The invention provides a vehicular control apparatus and a vehicular control method that restrain a catalyst from deteriorating.

A first aspect of this invention relates to a vehicular control apparatus mounted on a vehicle including an internal combustion engine, a rotating electrical machine, and a storage device that is supplied with a power from the rotating electrical machine. In this vehicular control apparatus, the vehicle can be decelerated through stoppage of injection of fuel into the internal combustion engine and regenerative braking by the rotating electrical machine. This vehicular control apparatus controls the vehicle such that a remaining capacity in the storage device becomes lower when a catalyst temperature of the internal combustion engine is high than when the catalyst temperature of the internal combustion engine is low.

The aforementioned vehicular control apparatus may control the vehicle such that the remaining capacity of the storage device becomes equal to a first target value when the catalyst temperature is higher than a first threshold, and that the remaining capacity of the storage device becomes equal to a second target value higher than the first target value when the catalyst temperature is equal to or lower than the first threshold.

The aforementioned vehicular control apparatus may control the vehicle such that the remaining capacity in the storage device decreases as the catalyst temperature increases.

The aforementioned vehicular control apparatus may control the storage device such that a target value of the remaining capacity in the storage device becomes low, in controlling the vehicle such that the remaining capacity in the storage device becomes low.

The aforementioned vehicular control apparatus may control the storage device such that the remaining capacity becomes equal to the first target value when a temperature of the storage device is higher than a second threshold, in a case where the catalyst temperature is higher than the first threshold.

The aforementioned vehicular control apparatus may control the vehicle such that the remaining capacity in the storage device becomes lower when a temperature in an interior of the vehicle is high than when the temperature of the interior of the vehicle is low.

In the aforementioned vehicular control apparatus, the vehicle may include an air-conditioning device capable of selecting one of an outside air introduction mode and an inside air circulation mode as an air-conditioning mode, and the storage device may be cooled using air in an interior of the vehicle. The vehicular control apparatus may determine the first target value on a basis of a selection history of the inside air circulation mode when the catalyst temperature is higher than the first threshold.

Another aspect of this invention, namely, a second aspect of this invention relates to a vehicular control method applied to a vehicle including an internal combustion engine, a rotating electrical machine, and a storage device that is supplied with a power from the rotating electrical machine. The vehicle can be decelerated through stoppage of injection of fuel into the internal combustion engine and regenerative braking by the rotating electrical machine. This vehicular control method includes a step of acquiring a catalyst temperature of the internal combustion engine, and a step of controlling the vehicle such that a remaining capacity in the storage device becomes lower when the catalyst temperature of the internal combustion engine is high than when the catalyst temperature of the internal combustion engine is low.

According to the first aspect of the invention and the second aspect of the invention, the SOC is low when the catalyst is at high temperatures. Thus, deceleration through regenerative braking is more likely to be possible than when the SOC is high. As a result, the number of opportunities to perform fuel cut or the time for performing fuel cut can be reduced during the deceleration of the vehicle. Thus, the catalyst can be restrained from deteriorating while suppressing the shortening in the life span of the storage device. Accordingly, it is possible to provide a vehicular control apparatus and a vehicular control method that restrain a catalyst from deteriorating.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the invention will be described hereinafter with reference to the drawings. In the following description, like components are denoted by like reference symbols. Like components are also identical in name and function to one another. Accordingly, the detailed description of those components will not be repeated.

<First Embodiment>

Figure 1:
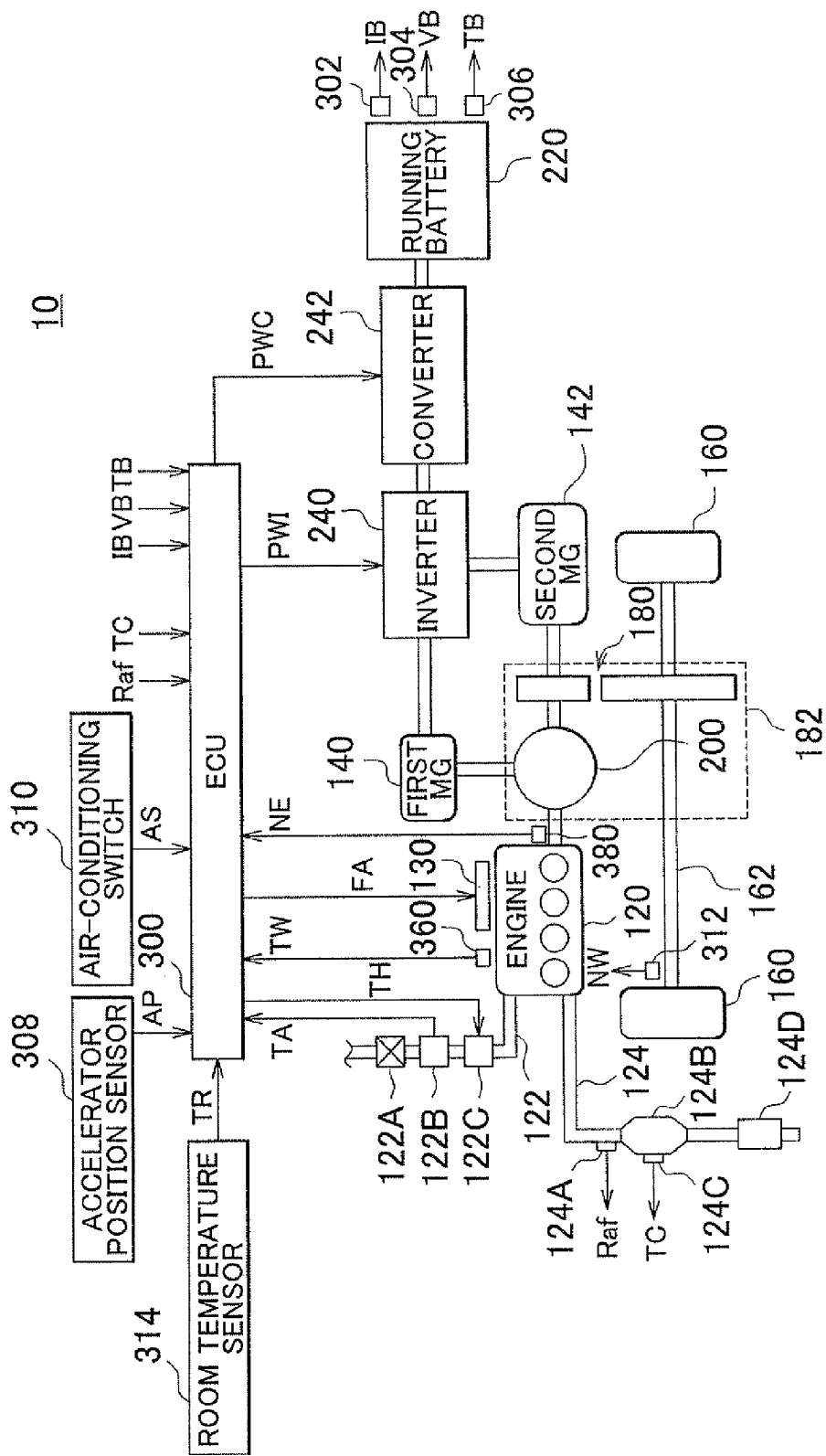
FIG. 1 is a view showing an overall configuration of a hybrid vehicle mounted with a vehicular control apparatus according to the first embodiment of the invention.

Referring to FIG. 1, a control block diagram of a hybrid vehicle 10 mounted with a vehicular control apparatus according to the embodiment of the invention will be described.

The hybrid vehicle 10 includes an engine 120, a first motor-generator (hereinafter referred to as the first MG) 140, a second motor-generator (hereinafter referred to as the second MG) 142, driving wheels 160, a transmission 182, a running battery 220, an inverter 240, a converter 242, and an electronic control unit (an ECU) 300.

The hybrid vehicle 10 is not limited to the configuration shown in FIG. 1 in particular as long as it can run using one of the engine 120 and the second MG 142 and can be decelerated using the second MG 142.

The first MG 140 is a rotating electrical machine. The first MG 140 functions as a generator that generates a power using a motive energy of the engine 120 and charges the running battery 220 via the inverter 240 and the converter 242. Further, the first MG 140 receives the power from the running battery 220 and rotates a crankshaft of the engine 120. Thus, the first MG 140 functions as a starter that starts the engine 120.

The second MG 142 is a rotating electrical machine. The second MG 142 functions as a drive motor that gives a driving force to the driving wheels 160. Further, the second MG 142 functions as a generator that charges the running battery 220 through regenerative braking.

The engine 120 is an internal combustion engine, for example, a gasoline engine, a diesel engine, or the like. An intake passage 122 of the engine 120 is provided with an air cleaner 122A, an intake air temperature sensor 122B, and an electronic throttle valve 122C.

The air cleaner 122A captures dust in intake air. The intake air temperature sensor 122B detects a temperature TA of air sucked into the engine 120 through the air cleaner 122A. The intake air temperature sensor 122B sends a signal indicating the detected temperature TA of air to the ECU 300.

The electronic throttle valve 1220 includes a valve for adjusting an amount of air sucked into the engine 120, a throttle motor that operates the valve on the basis of a control signal TH from the ECU 300, and a throttle valve position sensor for detecting a signal indicating an opening degree of the valve and sending the signal to the ECU 300.

The engine 120 includes a plurality of cylinders, and a fuel injection device 130 that supplies fuel to the plurality of the cylinders respectively. The fuel injection device 130 injects a suitable amount of fuel to each of the cylinders at a suitable timing on the basis of a fuel injection control signal FA from the ECU 300.

Further, an exhaust passage 124 of the engine 120 is provided with a three-way catalytic converter 124B as an exhaust gas purification catalyst, an air-fuel ratio sensor 124A that detects an air-fuel ratio (A/F) Raf in exhaust gas introduced into the three-way catalytic converter 124B, a catalyst temperature sensor 124C for detecting a temperature TC of the three-way catalytic converter 124B, and a muffler 124D.

The air-fuel ratio sensor 124A sends a signal indicating the detected air-fuel ratio Raf to the ECU 300. Further, the catalyst temperature sensor 124C sends a signal indicating the temperature TC of the three-way catalytic converter 124B to the ECU 300. Further, an oxygen sensor may be employed instead of the air-fuel ratio sensor 124A.

In addition, the engine 120 is provided with a coolant temperature sensor 360 for detecting a temperature TW of coolant flowing through the engine 120, and an engine rotational speed sensor 380 for detecting a rotational speed NE of the crankshaft of the engine 120. The coolant temperature sensor 360 sends a signal indicating the detected temperature TW of coolant to the ECU 300. The engine rotational speed sensor 380 sends a signal indicating the detected rotational speed NE of the crankshaft of the engine 120 to the ECU 300.

The transmission 182 includes a reduction gear 180 and a motive energy split mechanism 200. The reduction gear 180 transmits a motive energy generated by the engine 120 or the second MG 142 to the driving wheels 160. Further, the reduction gear 180 transmits to the engine 120 or the second MG 142 a reactive force received by the driving wheels 160 from a road surface.

The motive energy split mechanism 200 is, for example, a planetary gear mechanism (a planetary gear). The motive energy split mechanism 200 distributes a motive energy generated by the engine 120 to two paths, namely, the driving wheels 160 and the first MG 140. The planetary gear mechanism includes a sun gear, a ring gear, a carrier, and a pinion gear. For example, the sun gear of the planetary gear mechanism is connected to the first MG 140, the carrier of the planetary gear mechanism is connected to the engine 120, and the ring gear of the planetary gear mechanism is connected to the second MG 142. It should be noted that a speed change mechanism may be provided between the ring gear and the second MG 142.

In order to distribute the motive energy of the engine 120 to both the driving wheels 160 and the first MG 140, the planetary gear mechanism is employed as the motive energy split mechanism 200. Through the control of the rotational speed of the first MG 140, the motive energy split mechanism 200 function as a continuously variable transmission as well.

The running battery 220 is a storage device that stores therein a power for driving the first MG 140 and the second MG 142. The running battery 220 outputs a direct-current power. In this embodiment of the invention, the running battery 220 is a rechargeable secondary battery. The running battery 220 is formed of, for example, a nickel hydride battery, a lithium-ion battery, or the like. It should be noted that the running battery 220 is not limited to such batteries, and that a component capable of generating a direct-current voltage, for example, a capacitor, a solar battery, a fuel cell or the like is also applicable as the running battery 220.

The running battery 220 is provided with a current sensor 302 for detecting a current TB of the running battery 220, a voltage sensor 304 for detecting a voltage VB of the running battery 220, and a battery temperature sensor 306 for detecting a battery temperature TB of the running battery 220.

The current sensor 302 sends a signal indicating the current TB to the ECU 300. The voltage sensor 304 sends a signal indicating the voltage VB to the ECU 300. The battery temperature sensor 306 sends a signal indicating the battery temperature TB to the ECU 300.

The converter 242 steps up the direct-current power output from the running battery 220, and outputs the stepped-up direct-current power to the inverter 240. The converter 242 operates on the basis of a control signal PWC from the ECU 300. The ECU 300 controls the converter 242 by generating the control signal PWC such that an output voltage of the converter 242 becomes equal to a target voltage. The converter 242 has a built-in smoothing capacitor. When the converter 242 performs step-up operation, electric charges are stored in this smoothing capacitor.

The inverter 240 converts a direct current of the running battery 220 and an alternating current of each of the first MG 140 and the second MG 142 into each other. The inverter 240 receives a direct-current power from the converter 242 as an input, converts the direct-current power into an alternating-current power corresponding to a frequency command value based on a control signal PWI from the ECU 300, and outputs the alternating-current power to the first MG 140 and the second MG 142.

The ECU 300 controls the engine 120, the inverter 240, the converter 242, and the like, thereby controlling the entire hybrid system, namely, the charge/discharge state of the running battery 220 and the operation states of the engine 120, the first MG 140, and the second MG 142 such that the hybrid vehicle 10 can travel most efficiently.

It should be noted that although the ECU 300 is illustrated as a single ECU in FIG. 1, two or more ECU's may be employed. For example, the operation of the ECU 300 of FIG. 1 may be performed partially by an engine ECU for controlling the engine 120 and partially by a hybrid ECU for controlling the inverter 240 and the converter 242.

A driver seat is provided with an accelerator pedal (not shown). An accelerator position sensor 308 detects a depression amount AP of the accelerator pedal. The accelerator position sensor 308 sends a signal indicating the depression amount AP of the accelerator pedal to the ECU 300.

The ECU 300 controls outputs or power generation amounts of the first MG 140 and the second MG 142 and an output of the engine 120 in accordance with a required driving force corresponding to the depression amount AP of the accelerator pedal.

The driver seat is further provided with an air-conditioning switch 310. The air-conditioning switch 310 is a switch for making a changeover from one of air-conditioning modes, that is, an inside air circulation mode and an outside air introduction mode of an air-conditioning device to the other air-conditioning mode.

A room temperature sensor 314 detects a temperature TR of air in an interior of the hybrid vehicle 10. The room temperature sensor 314 sends a signal indicating the detected temperature TR to the ECU 300.

Furthermore, a drive shaft 162 of the driving wheels 160 is provided with a wheel speed sensor 312 for detecting a rotational speed NW of the driving wheels 160. The wheel speed sensor 312 sends a signal indicating the detected rotational speed NW of the driving wheels 160 to the ECU 300. The ECU 300 calculates a speed V of the hybrid vehicle 10 on the basis of the rotational speed NW of the driving wheels 160.

In the hybrid vehicle 10 having the configuration as described above, when the efficiency of the engine 120 is low during takeoff, low-speed running, or the like, the hybrid vehicle 10 is caused to run only by the second MG 142. Further, during normal running, the motive energy of the engine 120 is split into two paths by, for example, the motive energy split mechanism 200. The driving wheels 160 are directly driven by one motive energy. The first MG 140 is driven by the other motive energy and generates a power. At this moment, the ECU 300 drives the second MG 142 by the generated power. The driving wheels 160 are supplementarily driven through the driving of the second MG 142.

On the other hand, during deceleration, the second MG 142, which is driven by the driving wheels 160, functions as a generator to carry out regenerative power generation. A power recovered through regenerative power generation is stored into the running battery 220. It should be noted that the ECU 300 increases the output of the engine 120 to increase the amount of power generation by the first MG 140 when the running battery 220 especially needs to be charged due to a decrease in an SOC thereof. Thus, the SOC of the running battery 220 is increased. Further, even during low-speed running, the ECU 300 may perform the control of increasing the driving force from the engine 120 according to need. For example, such cases include a case where the running battery 220 needs to be charged as described above, a case where an auxiliary such as an air-conditioner or the like is driven, a case where the temperature TW of the coolant of the engine 120 is raised to a predetermined temperature, and the like.

In controlling the charge amount and discharge amount of the running battery 220, the ECU 300 sets a charge power upper limit Win and a discharge power upper limit Wout on the basis of at least the battery temperature TB and the current SOC (the control of the charge amount and the discharge amount will be referred to as charge/discharge control in the following description). For example, the discharge power upper limit Wout is set to a value that gradually decreases as the current SOC decreases. On the other hand, the charge power upper limit Win is set to a value that gradually decreases as the current SOC increases.

Further, the secondary battery employed as the running battery 220 has such a temperature dependency that the internal resistance thereof rises at low temperatures. Further, at high temperatures, the temperature of the secondary battery needs to be prevented from excessively rising due to additional heat release. Thus, it is preferable to limit the charge/discharge power (i.e., to reduce each of the values Win and Wout) at low temperatures and at high temperatures. In this manner, the ECU 300 sets the charge power upper limit Win and the discharge power upper limit Wout in accordance with the battery temperature TB and the current SOC.

Furthermore, in the hybrid vehicle 10 as shown in FIG. 1, the ECU 300 performs automatic stop control for the engine 120. That is, when the hybrid vehicle 10 is in a certain driving state or the running battery 220 is in a certain state, the ECU 300 automatically stops the engine 120 to make an improvement in fuel economy. Then, when the hybrid vehicle 10 is in a certain driving state or the running battery 220 is in a certain state even after the stoppage of the engine 120, the ECU 300 restarts the engine 120.

Figure 2:
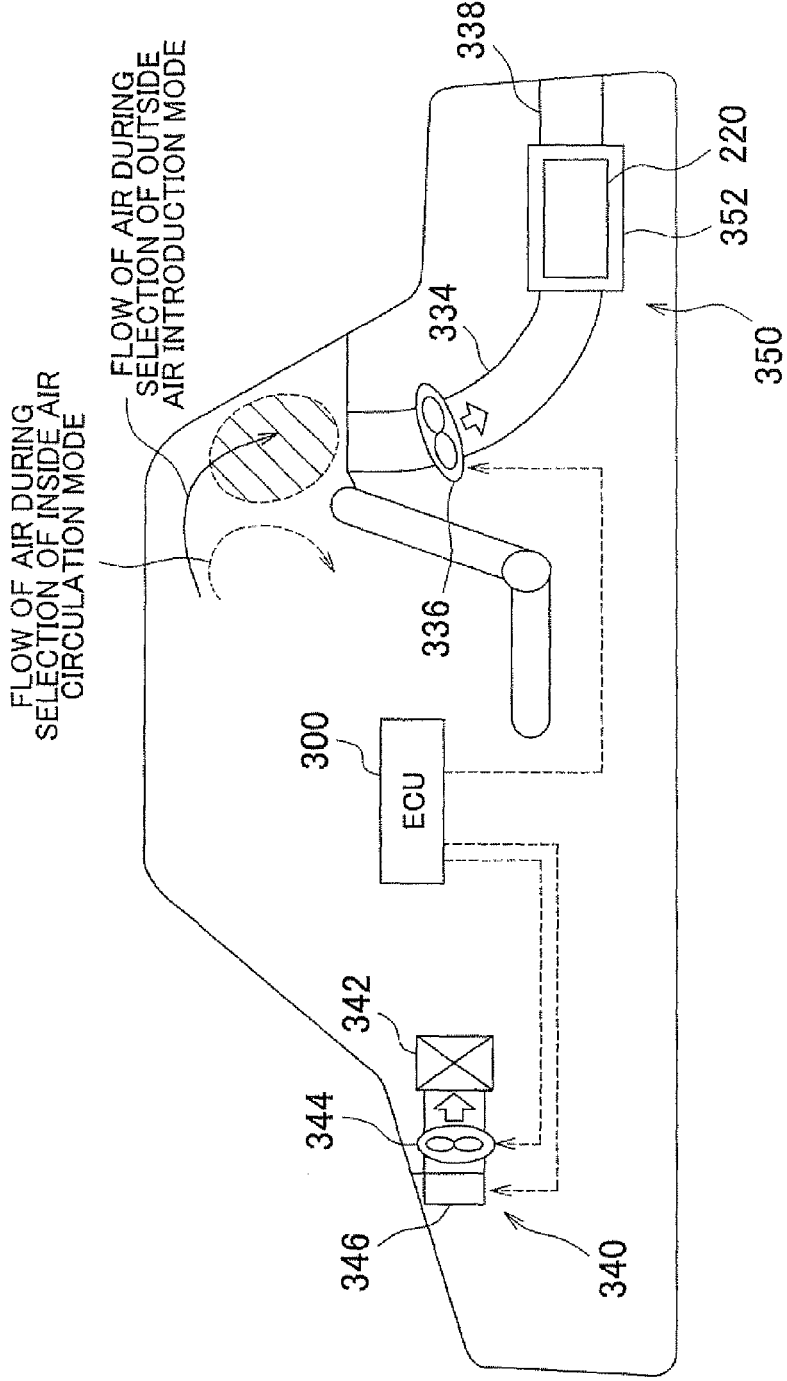
FIG. 2 is a view showing configurations of a battery cooling system and an air-conditioning system that are mounted on the hybrid vehicle.

A battery cooling system 350 shown in FIG. 2 includes a battery case 352, an intake duct 334, a battery cooling fan 336, an exhaust duct 338, and the ECU 300.

The battery 352 fixes the running battery 220 above a vehicle body panel under a trunk or a floor of the hybrid vehicle 10. Further, the battery case 352 accommodates the running battery 220 therein and hence protects the running battery 220 from the surroundings thereof.

The intake duct 334 is a pipeline for sending air in the interior of the hybrid vehicle 10 to the battery case 352. One end (an intake port) of the intake duct 334 is held in communication with a rear portion of a vehicle interior. The other end of the intake duct 334 is held in communication with the battery case 352. Thus, the air sucked into the intake duct 334 is sent to the battery case 352.

The battery cooling fan 336 is provided in the intake duct 334 to suck inside air from the intake duct 334 and send the air to the battery case 352. The battery cooling fan 336 operates in response to the reception of a control signal from the ECU 300. Due to the operation of the battery cooling fan 336, an air flow channel is formed such that the air in the vehicle interior is sucked in.

The exhaust duct 338 forms an air discharge channel through which the air in the battery case 352 is discharged to the outside of the hybrid, vehicle 10. One end of the exhaust duct 338 is connected to the battery case 352. The other end of the exhaust duct 338 is held in communication with the outside of the hybrid vehicle 10.

A vehicle interior air-conditioning system 340 operates when a user inputs an operation of activating the vehicle interior air-conditioning system 340 (an air-conditioner ON operation) to an air-conditioning switch (not shown).

During the operation of the vehicle interior air-conditioning system 340, a cooling medium is evaporated in an air-conditioning evaporator 342, so that the air sent to the vehicle interior by an air-conditioning fan 344 is cooled and dehumidified.

A changeover in the air sent to the vehicle interior by the air-conditioning fan 344 between inside air and outside air is made by an inside air/outside air changeover door 346. The position of the inside air/outside air changeover door 346 is changed over between a position corresponding to an inside air circulation mode and a position corresponding to an outside air introduction mode by, for example, a servomotor (not shown).

When the inside air circulation mode is selected, the ECU 300 controls the servomotor such that the position of the inside air/outside air changeover door 346 is changed over to such a position as to shut off the introduction of outside air. Because outside air is restrained from being introduced when the inside air circulation mode is selected, an air flow channel is formed such that air circulates through the interior.

When the outside air introduction mode is selected, the ECU 300 controls the servomotor such that the position of the inside air/outside air changeover door 346 is changed over to a position allowing the introduction of outside air. When the outside air introduction mode is selected, outside air is introduced into the interior, and an air flow channel through which the air in the interior is discharged from a rear portion of the vehicle is formed. In this embodiment of the invention, for example, when the outside air introduction mode is selected, an air flow channel through which the air introduced into the interior is discharged from the rear portion of the hybrid vehicle 10 via the intake duct 334, the battery case 352, and the exhaust duct 338 is formed.

In the hybrid vehicle 10 having the configuration as described above, during deceleration, a deceleration force may be generated by stopping the supply of fuel to the engine 120 (performing fuel cut).

However, in the case where this fuel cut is performed when a temperature TC of a three-way catalytic converter 124B used to purify exhaust gas is high, the atmosphere around the catalyst may become excessively rich in oxygen (become lean) to promote a deterioration in the catalyst. Thus, it is desirable to reduce the frequency of the performance of fuel cut by decelerating the vehicle through regenerative braking.

On the other hand, in the case where the hybrid vehicle 10 is controlled such that the SOC of the running battery 220 falls within a control range defined by a control upper limit and a control lower limit, when the SOC of the running battery 220 is high, the control upper limit of the SOC needs to be increased to absorb a power generated through regenerative braking. Due to the increase in the control upper limit, when the SOC of the running battery 220 increases, the life span of the running battery 220 may be shortened through overcharge.

Thus, in this embodiment of the invention, the ECU 300 controls the hybrid vehicle 10 such that the SOC of the running battery 220 becomes lower when the catalyst temperature of the engine 120 is high than when the catalyst temperature of the engine 120 is low.

Figure 3:
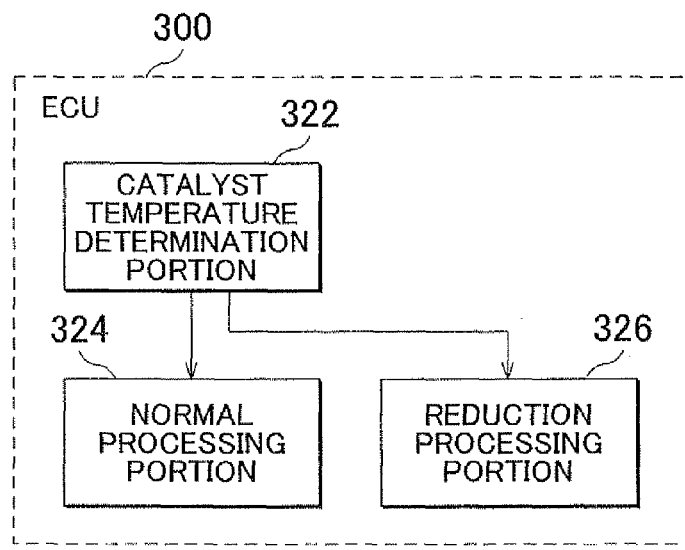
FIG. 3 is a functional block diagram of an ECU as the vehicular control apparatus according to the first embodiment of the invention.

FIG. 3 shows a functional block diagram of the ECU 300 as the vehicular control apparatus according to this embodiment of the invention. The ECU 300 includes a catalyst temperature determination portion 322, a normal processing portion 324, and a reduction processing portion 326.

The catalyst temperature determination portion 322 determines whether or not the catalyst temperature TC is higher than a threshold TC(0). The threshold TC(0) is, for example, a threshold set in accordance with the physical properties such as the material of the catalyst and the like. This threshold is a predetermined value lower than a temperature TC(1) at which the performance as the catalyst deteriorates due to the promotion of a deterioration in the catalyst when fuel cut control is performed. This is intended to reduce the SOC of the running battery 220 to an SOC at which a certain frequency of the performance of regenerative braking is obtained, before the catalyst temperature TC reaches the temperature TC(1), by setting the threshold TC(0) with a margin from the temperature TC(1). It should be noted that the catalyst temperature determination portion 322 may turn a catalyst high-temperature flag on, for example, when the catalyst temperature TC is higher than the threshold TC(0).

The normal processing portion 324 performs normal charge/discharge control (hereinafter referred to also as a normal processing) when the catalyst temperature TC is equal to or lower than the threshold TC(0). The normal processing portion 324 controls the charge/discharge of the running battery 220, for example, such that the SOC of the running battery 220 becomes equal to a target value SOC(1).

When the current SOC is lower than the target value SOC (1), the normal processing portion 324 increases the SOC by making the charge amount of the entire hybrid vehicle 10 larger than the discharge amount thereof with the aid of a power (a driving power or an electricity generating power) of the engine 120 and a power (a regenerative power) of the second MG 142.

When the current SOC is higher than the target value SOC (1), the normal processing portion 324 reduces the SOC by making the discharge amount of the entire hybrid vehicle 10 larger than the charge amount thereof through the use of a driving power of the second MG 142, the limitation on regenerative braking, or the like. It should be noted that the normal processing portion 324 may perform the normal processing, for example, when the catalyst high-temperature flag is off.

The reduction processing portion 326 performs an SOC reduction processing when the catalyst temperature TC is higher than the threshold TC(0). More specifically, the reduction processing portion 326 controls the charge/discharge of the running battery 220, for example, such that the SOC of the running battery 220 becomes equal to a target value SOC(2) lower than the target value SOC(1). It should be noted that the reduction processing portion 326 may perform the SOC reduction processing, for example, when the catalyst high-temperature flag is on. Further, during the performance of the SOC reduction processing, the reduction processing portion 326 may cancel the limitation on regenerative braking or may only limit regenerative braking when the SOC of the running battery 220 is higher than the target value SOC(1).

The reduction processing portion 326 sets the target value SOC(2) on the basis of the catalyst temperature TC. In this embodiment of the invention, the reduction processing portion 326 sets the target value SOC(2) corresponding to the catalyst temperature TC from, for example, the catalyst temperature TC and a map showing a relationship between the catalyst temperature TC and the target value SOC(2). It should be noted that the map is stored in, for example, a memory of the ECU 30. Further, a table, a mathematical expression, or the like may be used instead of the map.

In this embodiment of the invention, the catalyst temperature determination portion 322, the normal processing portion 324, and the reduction processing portion 326 are all described as functioning as pieces of software realized through the execution of the program stored in the memory by a CPU of the ECU 300. However, these portions may also be realized by pieces of hardware. It should be noted that this program is recorded in a recording medium which is mounted on the vehicle.

Figure 4:
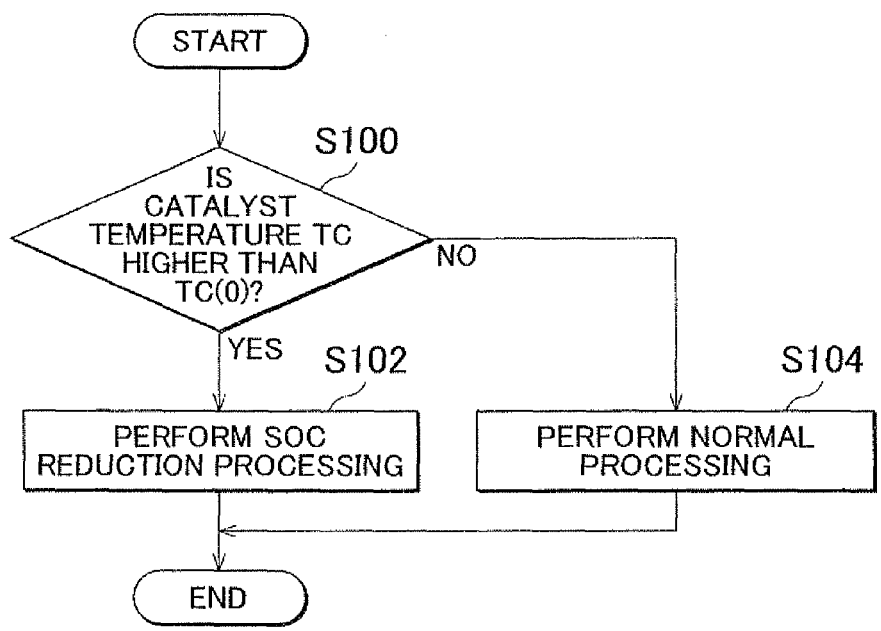
FIG. 4 is a flowchart showing a control structure of a program executed by the ECU as the vehicular control apparatus according to the first embodiment of the invention.

Referring to FIG. 4, a control structure of the program executed by the ECU 300 as the vehicular control apparatus according to this embodiment of the invention will be described.

In step (which will be referred to hereinafter as S) 100, the ECU 300 determines whether or not the catalyst temperature TC is higher than the threshold TC(0). When the catalyst temperature TC is higher than the threshold TC(0) (YES in S100), the processing is shifted to S102. Otherwise (NO in S100), the processing is shifted to S104.

In S102, the ECU 300 performs an SOC reduction processing. It should be noted that since the SOC reduction processing has been described above, the detailed description thereof will not be repeated. In S104, the ECU 300 performs the normal processing. It should be noted that since the normal processing has been described above, the detailed description thereof will not be repeated.

The operation of the ECU 300 as the vehicular control apparatus according to this embodiment of the invention, which is based on the foregoing structure and the foregoing flowchart, will be described using FIG. 5.

When the catalyst temperature TC of the hybrid vehicle 10 is equal to or lower than the threshold TC(0) (NO in S100), the normal processing is performed (S104). That is, the ECU 300 controls the charge/discharge of the running battery 220 such that the SOC of the running battery 220 becomes equal to the target value SOC(1).

Figure 5:
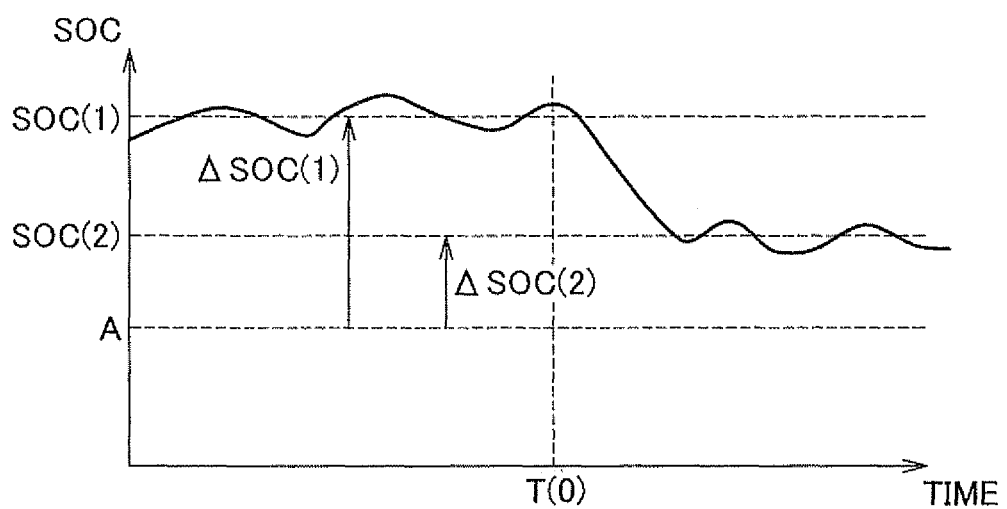
FIG. 5 is a timing chart showing the operation of the ECU as the vehicular control apparatus according to the first embodiment of the invention.

As shown in FIG. 5, until a time T(0), the charge/discharge of the running battery 220 is controlled such that the SOC thereof becomes equal to the target value SOC (1). As a result, the SOC of the running battery 220 changes in such a manner as to increase/decrease around the target value SOC(1).

When the hybrid vehicle 10 continues to run at high loads, for example, to run uphill during the operation of the engine 120, the catalyst temperature TC rises with the passage of time. As a result, when the catalyst temperature TC is higher than the threshold TC(0) at the time T(0) (YES in S100), the SOC reduction processing is performed (S102). That is, the ECU 300 controls the charge/discharge of the running battery 220 such that the SOC of the running battery 220 becomes equal to the target value SOC(2).

As shown in FIG. 5, at and after the time T(0), the charge/discharge of the running battery 220 is controlled such that the SOC thereof becomes equal to the target value SOC(2). At this moment, the SOC of the running battery 220 shifts from a state of increasing/decreasing around the target value SOC (1) to a state of increasing/decreasing around the target value SOC(2). Thus, the SOC of the running battery 220 tends to decrease.

Further, even when the hybrid vehicle 10 runs in the same manner, the input/output amount of the power in the running battery 220 in the case where the reduction processing is performed is smaller than the input/output amount of the power in the running battery 220 in the case where the normal processing is performed. Thus, the battery temperature TB tends to become lower in the case where the reduction processing is performed.

For example, when the SOC of the running battery 220 decreases to a control lower limit A during the performance of the normal processing or the reduction processing, charge/discharge control is performed such that the SOC recovers to the target value SOC(1) or SOC(2), by, for example, starting the engine 120.

At this moment, an amount ASOC(2) of an increase in the SOC to the target value SOC(2) during the reduction processing is smaller than an amount ASOC(1) of an increase in the SOC to the target value SOC(1) during the normal processing. Thus, the amount of heat release resulting from the charge/discharge of the running battery 220 is smaller during the performance of the reduction processing than during the performance of the normal processing. Thus, the battery temperature TB of the running battery 220 tends to be lower during the performance of the reduction processing than during the performance of the normal processing.

By thus reducing the SOC or the battery temperature TB before the temperature of the three-way catalytic converter 124B becomes high, the charge power upper limit Win is restrained from decreasing due to an increase in the SOC or the battery temperature TB at the time when the catalyst is at high temperatures. Thus, in the running battery 220, when the catalyst is at high temperatures, the charge of the running battery 220 through regenerative braking is likely to be accepted (regenerative braking is unlikely to be limited). As a result, the frequency of the performance of fuel cut control for the engine 120 decreases.

As described above, the vehicular control apparatus according to this embodiment of the invention makes it possible to reduce the SOC of the running battery 220 when the three-way catalytic converter 124B is at high temperatures, by performing the SOC reduction processing when the catalyst temperature TC is higher than the threshold TC(0). Thus, the charge power upper limit Win can be restrained more from decreasing than when the SOC is high. Therefore, the number of opportunities to carry out regenerative braking can be increased. As a result, the number of opportunities to perform fuel cut control or the time for performing fuel cut control can be reduced during deceleration of the hybrid vehicle 10. Thus, the catalyst is restrained from deteriorating while suppressing the shortening in the life span of the running battery 220. Accordingly, a vehicular control apparatus and a vehicular control method that restrain a catalyst from deteriorating can be provided.

In this embodiment of the invention, the ECU 300 has been described as setting the target value SOC(2) using the catalyst temperature TC and the map showing the relationship between the catalyst temperature TC and the target value SOC(2) when the catalyst temperature TC is higher than the threshold TC(0). However, for example, it is sufficient that the ECU 300 be capable of controlling the vehicle such that the remaining capacity becomes lower when the catalyst temperature is high than when the catalyst temperature is low, and the invention is not limited in particular to the above-mentioned manner of setting the target value SOC(2). For example, on the assumption that the detected catalyst temperature TC and the target value SOC(2) are in a proportional relationship in which the target value SOC(2) decreases as the catalyst temperature increases, the ECU 300 may determine the target value SOC(2) by multiplying the detected catalyst temperature TC by a predetermined coefficient, or set a predetermined value as the target value SOC(2).

It should be noted that although the catalyst temperature TC has been described as being detected and acquired using the catalyst temperature sensor 124C in this embodiment of the invention, it is also appropriate to estimate and acquire the catalyst temperature TC on the basis of an operation state of the engine 120 (e.g., a throttle opening degree, an intake air amount, an intake air temperature, an engine rotational speed, or the like).

Further, in this embodiment of the invention, the ECU 300 has been described as controlling the charge/discharge of the running battery 220 such that the SOC of the running battery 220 becomes equal to the target value SOC(1) as the normal processing. However, for example, it is also appropriate to set the target value SOC(1) as a control median value, and control the charge/discharge of the running battery 220 such that the current SOC is held within an SOC control range corresponding to the set control median value.

By the same token, as the SOC reduction processing, the ECU 300 may set the target value SOC(2) as a control median value, and control the charge/discharge of the running battery 220 such that the current SOC is held within an SOC control range corresponding to the set control median value.

The ECU 300 controls the charge/discharge of the running battery 220 such that the current SOC is held within the SOC control range. Each of the SOC control ranges is so set as to have a corresponding one of a first control width and a second control width, which is defined by a control upper limit and a control lower limit, with respect to the control median value.

The first control width and the second control width may be equal to each other or different from each other.

Further, the control lower limit and the control upper limit in the case where the target value SOC(2) is set as the control median value are set lower than the control lower limit and the control upper limit in the case where the target value SOC(1) is set as the control median value, respectively. Further, the control upper limit and the control lower limit are set within a range of an upper limit and a lower limit according to the specification of the running battery 220. Thus, in some cases, the control upper limit or the control lower limit in the case where the target value SOC(1) is set as the control median value and the control upper limit or the control lower limit in the case where the target value SOC(2) is set as the control median value are set to the same value.

The ECU 300 charges the running battery 220 when the current SOC decreases below the control lower limit of the SOC control range. That is, the ECU 300 demands the operation of the engine 120. Thus, when the engine 120 is stopped, it is started.

The ECU 300 designates the discharge of the running battery 220 when the current SOC is within the SOC control range. At this moment, the ECU 300 does not start the engine 120 for the purpose of charging the running battery 220.

The ECU 300 sets the charge power upper limit Win low when the current SOC approaches the control upper limit. In this case, regenerative braking by the second MG 142 is limited, so that the overcharge of the running battery 220 is avoided. It should be noted that a braking force needed for the entire hybrid vehicle 10 is generated only by a. hydraulic brake mechanism (not shown) when regenerative braking is limited.

Further, in order to prevent regenerative braking from being limited when the target value SOC(2) is set as the control median value, the ECU 300 may cancel the limitation on regenerative braking in the case where the SOC is higher than the control upper limit, or may set only a condition concerning the limitation on regenerative braking as a condition that the SOC approach the control upper limit in the case where the target value SOC(1) is set as the control median value.

Thus, by selecting the target value SOC(2) as the control median value when the catalyst temperature TC is higher than the threshold TC(0) in the case where the target value SOC(1) is selected as the control median value, the SOC of the running battery 220 can be reduced more than in the case where the target value SOC(1) is selected as the control median value. The SOC of the running battery 220 can be reduced before the temperature of the three-way catalytic converter 124 becomes high. Thus, the frequency of the performance of regenerative braking can be increased. As a result, the frequency of the performance of fuel cut control or the time for performing fuel cut control can be reduced.

Figure 6:
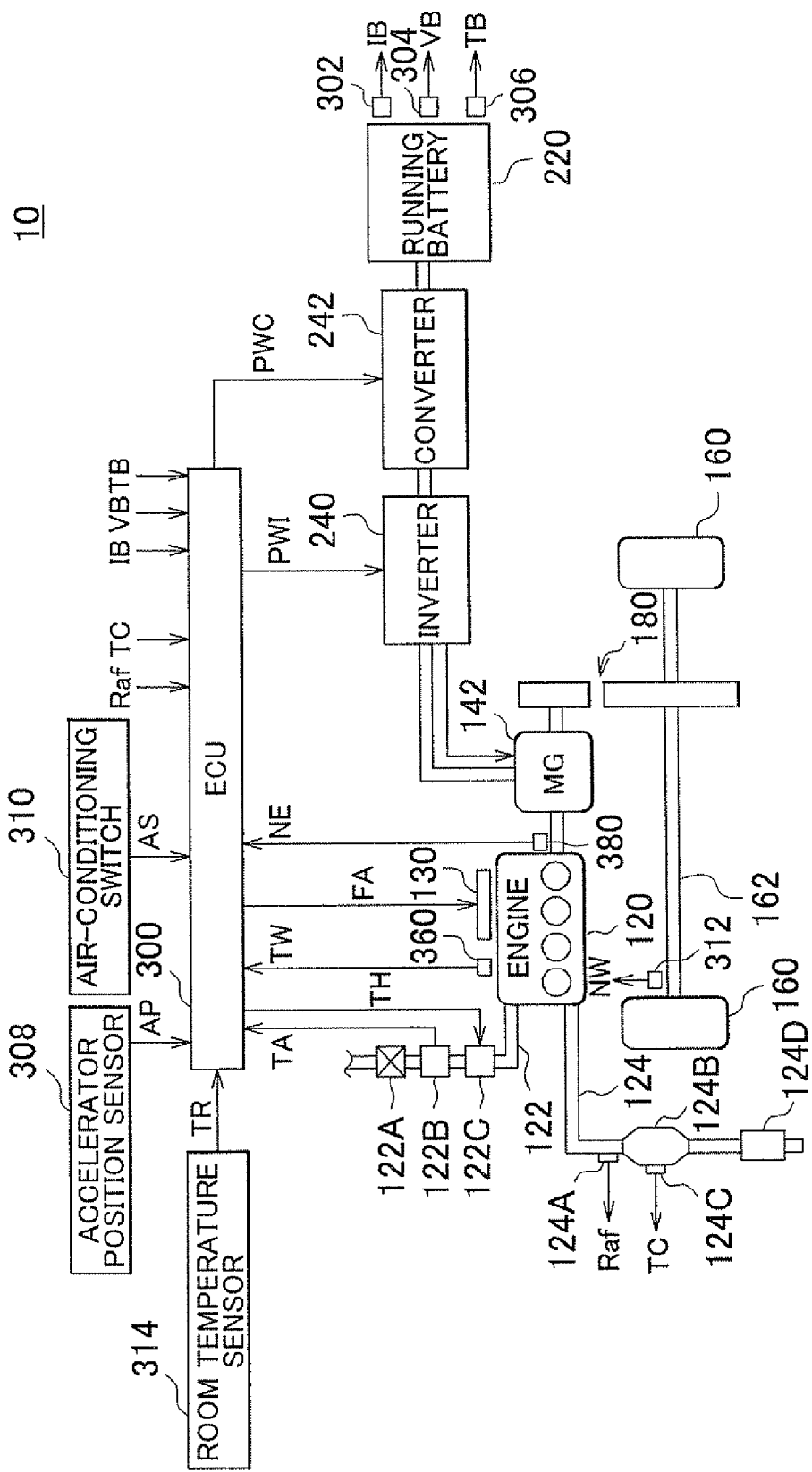
FIG. 6 is a view showing another configurational example of the hybrid vehicle.

In this embodiment of the invention, the case where the invention is applied to the hybrid vehicle 10 having the two motor-generators (the first MG 140 and the second MG 142) has been described. However, the invention is not limited to this type of hybrid vehicle in particular. As shown in, for example, FIG. 6, the hybrid vehicle 10 may be a parallel-type hybrid vehicle including the engine 120 and a driving motor-generator directly-coupled to the crankshaft of the engine 120. Alternatively, the hybrid vehicle 10 may be a vehicle having front wheels driven by an engine and rear wheels driven by an electric motor.

<Second Embodiment>

A vehicular control apparatus according to the second embodiment of the invention will be described hereinafter.

The configuration of the vehicular control apparatus according to this embodiment of the invention is different in the operation of the ECU 300 from the configuration of the vehicular control apparatus according to the foregoing first embodiment of the invention. A hybrid vehicle according to this embodiment of the invention is identical to the hybrid vehicle 10 according to the foregoing first embodiment of the invention in other configurational details. The components of the hybrid vehicle are denoted by the same reference symbols as in the first embodiment invention respectively, and have the same functions as in the first embodiment of the invention respectively. Accordingly, the detailed description of those components will not now be repeated.

In this embodiment of the invention, the ECU 300 controls the charge/discharge of the running battery 220 such that the SOC of the running battery 220 becomes equal to the target value SOC(2) when the battery temperature TB of the running battery 220 is higher than a threshold TB(0), in the case where the catalyst temperature TC is higher than a threshold TC(0).

Figure 7:
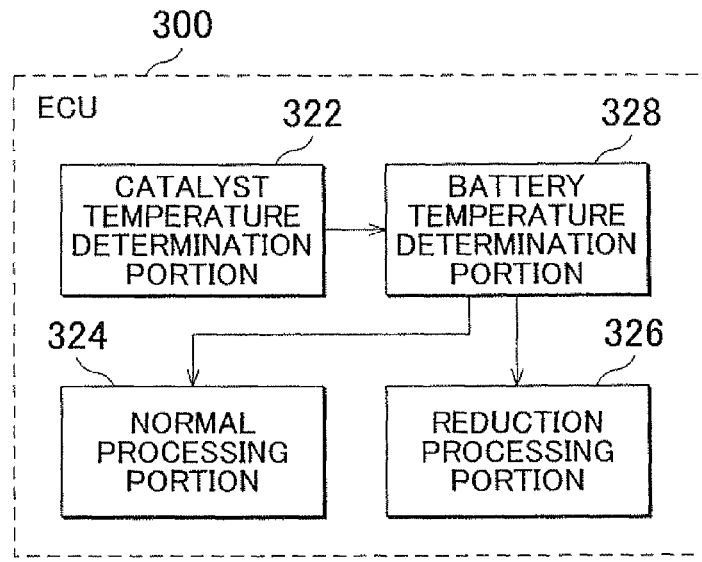
FIG. 7 is a functional block diagram of an ECU as a vehicular control apparatus according to the second embodiment of the invention.

FIG. 7 shows a functional block diagram of the ECU 300 as the vehicular control apparatus according to this embodiment of the invention. It should be noted that the functional block diagram of the ECU 300 shown in FIG. 7 is different from the functional block diagram of the ECU 300 shown in FIG. 3 in the inclusion of a battery temperature determination portion 328 and the operations of some functional blocks which will be described below. The functional block diagram of the ECU 300 in this embodiment of the invention is identical to the functional block diagram of the ECU 300 described in the foregoing first embodiment of the invention in other configurational details and other operational details. Thus, the description of such details will not now be repeated.

The battery temperature determination portion 328 determines whether or not the battery temperature TB is higher than the threshold TB(0). The threshold TB(0) is, for example, a predetermined value for determining that the charge efficiency has decreased below a threshold. It should be noted that the battery temperature determination portion 328 may turn a battery high-temperature flag on, for example, when the battery temperature TB is higher than the threshold TB(0).

The normal processing portion 324 performs the normal processing when the catalyst temperature TC is equal to or lower than the threshold TC(0) or when the battery temperature TB is equal to or lower than the threshold TB(0). It should be noted that the normal processing portion 324 may perform the normal processing, for example, when at least one of the catalyst high-temperature flag and the battery high-temperature flag is off.

The reduction processing portion 326 performs the SOC reduction processing when the catalyst temperature TC is higher than the threshold TC(0) and the battery temperature TB is higher than the threshold TB(0). It should be noted that the reduction processing portion 326 may perform the reduction processing, for example, when both the catalyst high-temperature flag and the battery high-temperature flag are on.

It should be noted that since the normal processing and the SOC reduction processing have been described above, the detailed description thereof will not be repeated.

In this embodiment of the invention, the catalyst temperature determination portion 322, the normal processing portion 324, the reduction processing portion 326, and the battery temperature determination portion 328 are all described as functioning as pieces of software realized through the execution of the program stored in the memory by the CPU of the ECU 300. However, these portions may also be realized by pieces of hardware. It should be noted that this program is recorded in a recording medium which is mounted on the vehicle.

Figure 8:
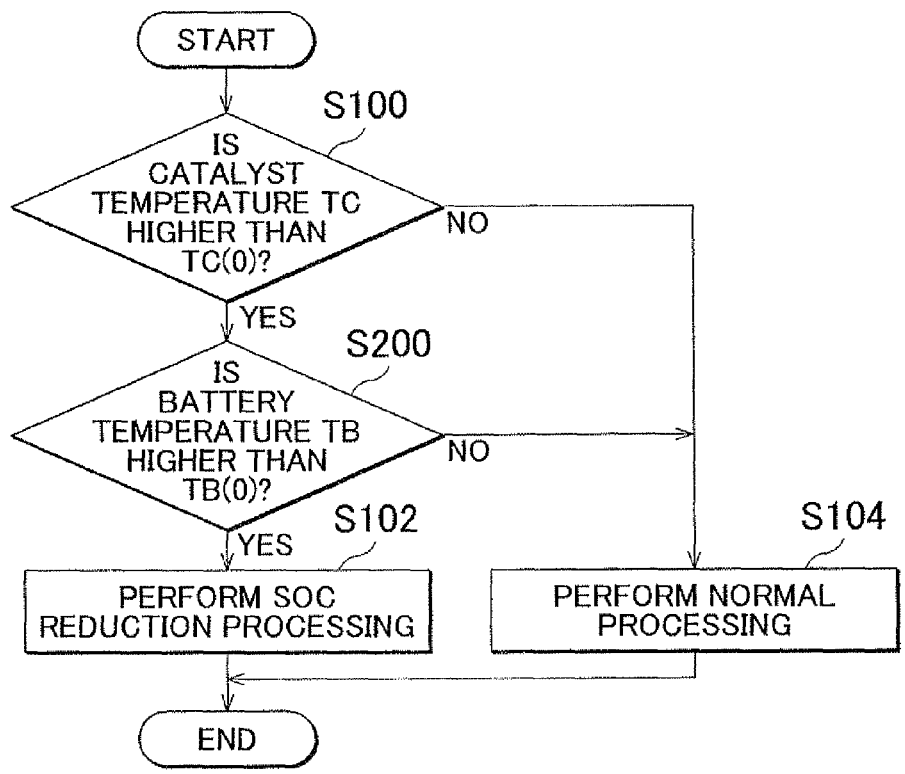
FIG. 8 is a flowchart showing a control structure of a program executed by the ECU as the vehicular control apparatus according to the second embodiment of the invention.

Referring to FIG. 8, a control structure of the program executed by the ECU 300 as the vehicular control apparatus according to this embodiment of the invention will be described.

It should be noted in the flowchart shown in FIG. 8 that each processing identical to that of the foregoing flowchart shown in FIG. 4 is denoted by the same step number as in FIG. 4, and is identical in the processing contents to that of FIG. 4 as well. Accordingly, the detailed description of such steps will not now be repeated.

When the catalyst temperature TC is higher than the threshold TC(0) (YES in S100), the ECU 300 determines in S200 whether or not the battery temperature TB is higher than the threshold TB(0). When the battery temperature TB is higher than the threshold TB(0) (YES in S200), the processing is shifted to S102. Otherwise (NO in S200), the processing is shifted to S104.

It should be noted that the sequence of making a determination on the battery temperature TB and a determination on the catalyst temperature TC in the flowchart of FIG. 8 is not limited in particular to a sequence in which the determination on the battery temperature TB is made after the determination on the catalyst temperature TC is made. For example, these determinations may be made in the reverse sequence or at the same time.

The operation of the ECU 300 as the vehicular control apparatus according to this embodiment of the invention, which is based on the foregoing structure and the foregoing flowchart, will be described.

When the catalyst temperature TC of the hybrid vehicle 10 is equal to or lower than the threshold TC(0) (NO in S100) or when the battery temperature TB is equal to or lower than the threshold TB(0) (NO in S200), the normal processing is performed (S104). That is, the ECU 300 controls the charge/discharge of the running battery 220 such that the SOC of the running battery 220 becomes equal to the target value SOC (1).

As a result of controlling the charge/discharge of the running battery 220 such that the SOC of the running battery 220 becomes equal to the target value SOC(1), the SOC of the running battery 220 changes in such a manner as to increase/decrease around the target value SOC (1).

When the hybrid vehicle 10 continues to run at high loads, for example, to run uphill during the operation of the engine 120, the catalyst temperature TC rises with the passage of time. As a result, when the catalyst temperature TC is higher than the threshold TC(0) (YES in S100) and the battery temperature TB is higher than the threshold TB(0) (YES in S200), the SOC reduction processing is performed (S102). That is, the ECU 300 controls the charge/discharge of the running battery 220 such that the SOC of the running battery 220 becomes equal to the target value SOC(2).

As described in the foregoing first embodiment of the invention, the SOC and the battery temperature TB tend to be lower in the case where the reduction processing is performed than in the case where the normal processing is performed.

By thus reducing the SOC or the battery temperature TB before the temperature of the three-way catalytic converter 124B becomes high, the charge power upper limit Win is restrained from decreasing due to an increase in the SOC or the battery temperature TB at the time when the catalyst is at high temperatures. Thus, in the running battery 220, when the catalyst is at high temperatures, the charge of the running battery 220 through regenerative braking is likely to be accepted (regenerative braking is unlikely to be limited). As a result, the frequency of the performance of fuel cut control for the engine 120 decreases.

As described above, the vehicular control apparatus according to this embodiment of the invention achieves the following operations and effects in addition to the operations and effects of the vehicular control apparatus according to the foregoing first embodiment of the invention.

When the charge power upper limit Win decreases due to the high battery temperature TB, there arises a situation in which the charge through regenerative braking is unlikely to be accepted. Thus, under this situation, the SOC reduction processing is performed when the catalyst temperature TC is higher than the threshold TC(0), so that the SOC of the running battery 220 can be reduced more than in the case where the normal processing is performed, and the battery temperature TB can be restrained from rising. Thus, regenerative braking is unlikely to be limited. As a result, the frequency of the performance of fuel cut control for the engine 120 can be reduced when the catalyst is at high temperatures.

It has been described in this embodiment of the invention that the SOC reduction processing is performed when the battery temperature TB is higher than the threshold TB(0) in the case where the catalyst temperature TC is higher than the threshold TC(0). However, for example, the SOC reduction processing may be performed when the sum of amounts of power input/output to/from the running battery 220 for a predetermined period preceding a current time point (or for a predetermined distance to a current position) is larger than a threshold in the case where the catalyst temperature TC is higher than the threshold TC(0). This is because the amount of heat release in the running battery 220 increases and the battery temperature TB increases as the input/output amount of the power increases.

More specifically, the ECU 300 calculates a value (hereinafter referred to as an integrated value of the SOC) obtained by converting the input/output amount of the power in the running battery 220 on each predetermined calculation cycle into an amount of change in the SOC and integrating this amount of change in the SOC. The ECU 300 performs the SOC reduction processing when the integrated value of the SOC for the predetermined period is larger than a threshold. The ECU 300 resets the integrated value of the SOC to an initial value, that is, zero every time the predetermined period elapses.

Figure 9:
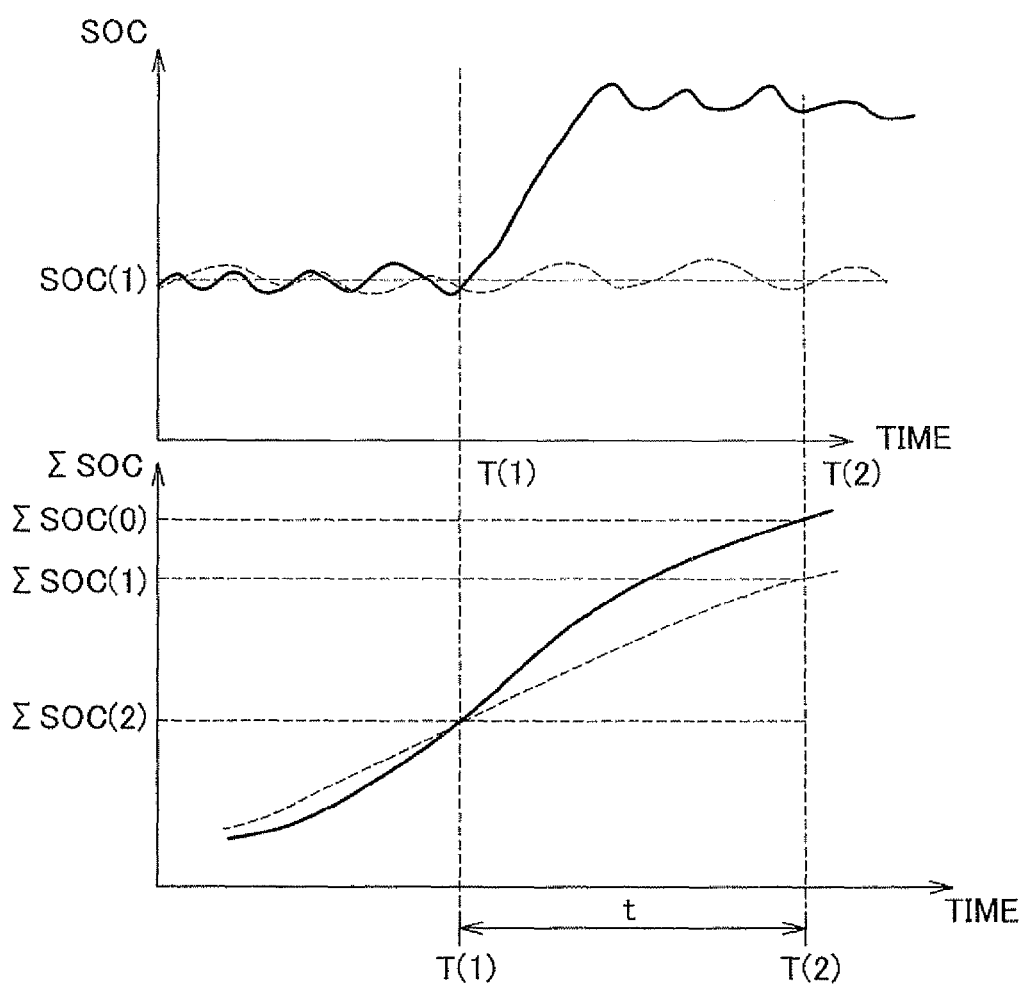
FIG. 9 includes a timing chart showing changes in an SOC and a timing chart showing changes in an integrated value thereof.

For example, as indicated by a solid line of FIG. 9, it is assumed that the SOC increases at and after a time T(1). In the case where the catalyst temperature TC is higher than the threshold TC(0) at a time T(2), the SOC reduction processing may be performed when an integrated value $\Sigma SOC(0)$-$\Sigma SOC(2)$ of the SOC for a predetermined period from the time T(1) to the time T(2) (or for a predetermined distance) is larger than a threshold.

Alternatively, in the case where the catalyst temperature TC is higher than the threshold TC(0), the SOC reduction processing may be performed when an integrated value $\Sigma SOC(0)$-$\Sigma SOC(1)$ of the SOC for a predetermined period (for a predetermined distance) is larger than a threshold as indicated by a broken line of FIG. 9 from the aforementioned $\Sigma SOC(0)$.

Alternatively, the aforementioned integrated value of the SOC may be replaced with an integrated value of the battery temperature TB (an integrated value of the absolute value of the amount of change in the battery temperature), and the SOC reduction processing may be performed when the integrated value of the battery temperature TB is larger than a threshold in the case where the catalyst temperature TC is higher than the threshold T(0).

Further, the SOC reduction processing may be performed not only when the aforementioned integrated value of the SOC is larger than the threshold but also when the aforementioned integrated value of the battery temperature TB is larger than the threshold.

<Third Embodiment>

A vehicular control apparatus according to the third embodiment of the invention will be described hereinafter. The configuration of the vehicular control apparatus according to this embodiment of the invention is different in the operation of the ECU 300 from the configuration of the vehicular control apparatus according to the foregoing first embodiment of the invention. A hybrid vehicle according to this embodiment of the invention is identical to the hybrid vehicle 10 according to the foregoing first embodiment of the invention in other configurational details. The components of the hybrid vehicle are denoted by the same reference symbols as in the first embodiment invention respectively, and have the same functions as in the first embodiment of the invention respectively. Accordingly, the detailed description of those components will not now be repeated.

In this embodiment of the invention, the ECU 300 controls the charge/discharge of the running battery 220 such that the SOC of the running battery 220 becomes equal to the target value SOC(2) when a room temperature TR of the hybrid vehicle 10 is higher than a threshold TR(0) in the case where the catalyst temperature TC is higher than the threshold TC(0).

Figure 10:
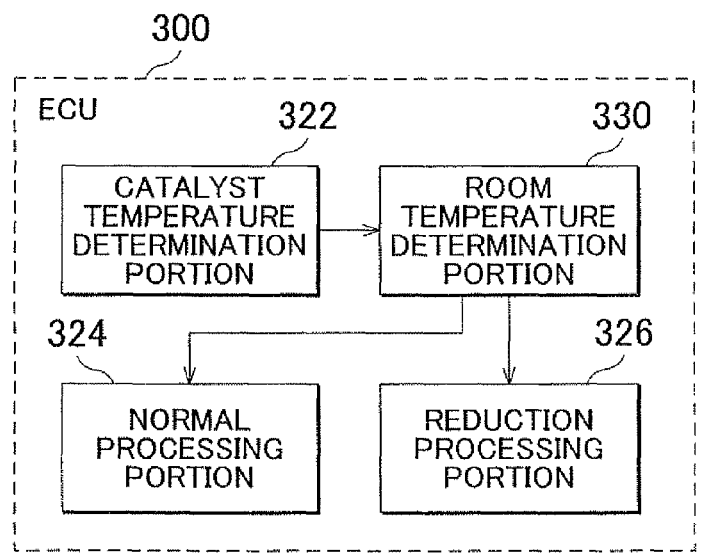
FIG. 10 is a functional block diagram of an ECU as a vehicular control apparatus according to the third embodiment of the invention.

FIG. 10 shows a functional block diagram of the ECU 300 as the vehicular control apparatus according to this embodiment of the invention. It should be noted that the functional block diagram of the ECU 300 shown in FIG. 10 is different from the functional block diagram of the ECU 300 shown in FIG. 3 in the inclusion of a room temperature determination portion 330 and the operations of some functional blocks which will be described below. The functional block diagram of the ECU 300 in this embodiment of the invention is identical to the functional block diagram of the ECU 300 described in the foregoing first embodiment of the invention in other configurational details and other operational details. Thus, the description of such details will not now be repeated.

The room temperature determination portion 330 determines whether or not the room temperature TR is higher than the threshold TR(0). The threshold TR(0) is, for example, a predetermined value for determining that the charge efficiency has decreased below a threshold. It should be noted that the room temperature determination portion 330 may turn a room high-temperature flag on, for example, when the room temperature TR is higher than the threshold TR(0).

The normal processing portion 324 performs the normal processing when the catalyst temperature TC is equal to or lower than the threshold TC(0) or when the room temperature TR is equal to or lower than the threshold TR(0). It should be noted that the normal processing portion 324 may perform the normal processing when at least one of the catalyst high-temperature flag and the room high-temperature flag is off The reduction processing portion 326 performs the SOC reduction processing when the catalyst temperature TC is higher than the threshold TC(0) and the room temperature TR is higher than the threshold TR(0). It should be noted that the reduction processing portion 326 may perform the reduction processing, for example, when both the catalyst high-temperature flag and the room high-temperature flag are on.

It should be noted that since the normal processing and the SOC reduction processing have been described above, the detailed description thereof will not be repeated.

In this embodiment of the invention, the catalyst temperature determination portion 322, the normal processing portion 324, the reduction processing portion 326, and the room temperature determination portion 330 are all described as functioning as pieces of software realized through the execution of the program stored in the memory by the CPU of the ECU 300. However, these portions may also be realized by pieces of hardware. It should be noted that this program is recorded in a recording medium which is mounted on the vehicle.

Figure 11:
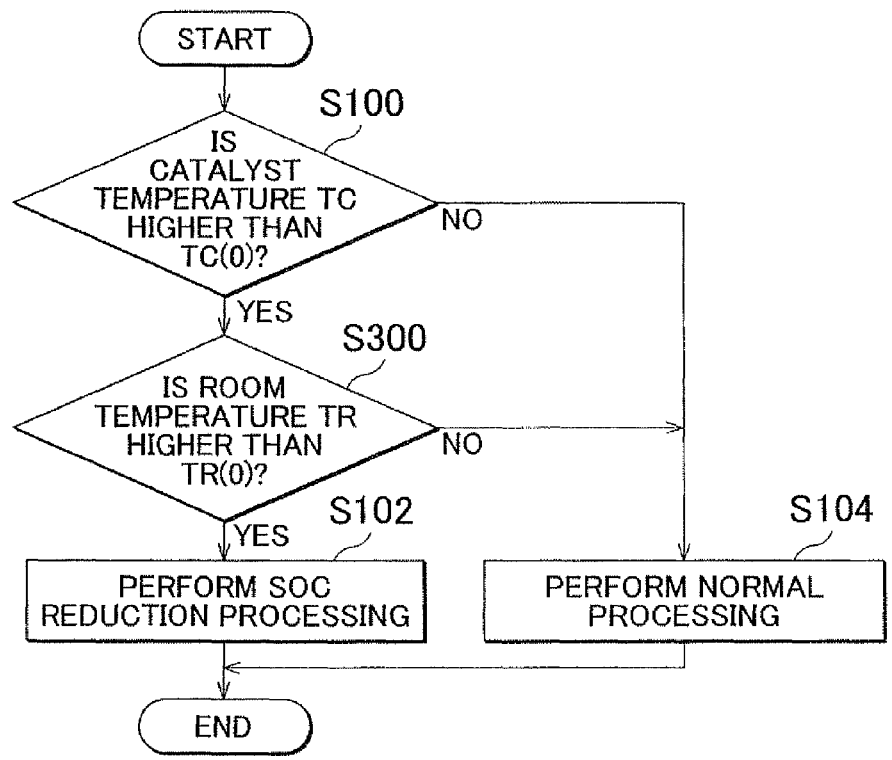
FIG. 11 is a flowchart showing a control structure of a program executed by the ECU as the vehicular control apparatus according to the third embodiment of the invention.

Referring to FIG. 11, a control structure of the program executed by the ECU 300 as the vehicular control apparatus according to this embodiment of the invention will be described.

It should be noted in the flowchart shown in FIG. 11 that each processing identical to that of the foregoing flowchart shown in FIG. 4 is denoted by the same step number as in FIG. 4, and is identical in the processing contents to that of FIG. 4 as well. Accordingly, the detailed description of such steps will not now be repeated.

When the catalyst temperature TC is higher than the threshold TC(0) (YES in S100), the ECU 300 determines in S300 whether or not the room temperature TR is higher than the threshold TR(0). When the room temperature TR is higher than the threshold TR(0) (YES in S300), the processing is shifted to S102. Otherwise (NO in S300), the processing is shifted to S104.

It should be noted that the sequence of making a determination on the room temperature TR and a determination on the catalyst temperature TC in the flowchart of FIG. 11 is not limited in particular to a sequence in which the determination on the room temperature TR is made after the determination on the catalyst temperature TC is made. For example, these determinations may be made in the reverse sequence or at the same time.

The operation of the ECU 300 as the vehicular control apparatus according to this embodiment of the invention, which is based on the foregoing structure and the foregoing flowchart, will be described.

When the catalyst temperature TC of the hybrid vehicle 10 is equal to or lower than the threshold TC(0) (NO in S100) or when the room temperature TR is equal to or lower than the threshold TR(0) (NO in S300), the normal processing is performed (S104). That is, the ECU 300 controls the charge/discharge of the running battery 220 such that the SOC of the running battery 220 becomes equal to the target value SOC (1).

As a result of controlling the charge/discharge of the running battery 220 such that the SOC of the running battery 220 becomes equal to the target value SOC(1), the SOC of the running battery 220 changes in such a manner as to increase/decrease around the target value SOC (1).

When the hybrid vehicle 10 continues to run at high loads, for example, to run uphill during the operation of the engine 120, the catalyst temperature TC rises with the passage of time. As a result, when the catalyst temperature TC is higher than the threshold TC(0) (YES in S100) and the room temperature TR is higher than the threshold TR(0) (YES in S300), the SOC reduction processing is performed (S102). That is, the ECU 300 controls the charge/discharge of the running battery 220 such that the SOC of the running battery 220 becomes equal to the target value SOC(2).

As a result of controlling the charge/discharge of the running battery 220 such that the SOC of the running battery 220 becomes equal to the target value SOC(2), the SOC of the running battery 220 shifts from a state of increasing/decreasing around the target value SOC(1) to a state of increasing/decreasing around the target value SOC(2). Thus, the SOC of the running battery 220 tends to decrease.

As described in the foregoing first embodiment of the invention, the SOC and the battery temperature TB tend to be lower in the case where the reduction processing is performed than in the case where the normal processing is performed.

Owing to these decreases in the SOC and the battery temperature TB, the charge power upper limit Win is restrained from decreasing due to an increase in the SOC or the battery temperature TB. Thus, in the running battery 220, the charge of the running battery 220 through regenerative braking is likely to be accepted (regenerative braking is unlikely to be limited). As a result, the frequency of the performance of fuel cut control for the engine 120 decreases.

As described above, the vehicular control apparatus according to this embodiment of the invention achieves the following operation and effect in addition to the operations and effects of the vehicular control apparatus according to the foregoing first embodiment of the invention.

The battery temperature TB tends to be higher when the room temperature TR is higher than the threshold TR(0) than when the room temperature TR is equal to or lower than the threshold TR(0). This is because the running battery 220 is cooled using air in the interior.

Therefore, when the charge power upper limit Win decreases due to the room temperature TR higher than the threshold TR(0) (i.e., the high battery temperature TB), there arises a situation in which the charge through regenerative braking is unlikely to be accepted. Thus, under this situation, the SOC reduction processing is performed when the catalyst temperature TC is higher than the threshold TC(0), so that the SOC of the running battery 220 can be reduced more than in the case where the normal processing is performed, and the battery temperature TB can be restrained from rising. Thus, regenerative braking is unlikely to be limited. As a result, the frequency of the performance of fuel cut control for the engine 120 can be reduced when the catalyst is at high temperatures.

<Fourth Embodiment>

A vehicular control apparatus according to the fourth embodiment of the invention will be described hereinafter. The configuration of the vehicular control apparatus according to this embodiment of the invention is different in the operation of the ECU 300 from the configuration of the vehicular control apparatus according to the foregoing first embodiment of the invention. A hybrid vehicle according to this embodiment of the invention is identical to the hybrid vehicle 10 according to the foregoing first embodiment of the invention in other configurational details. The components of the hybrid vehicle are denoted by the same reference symbols as in the first embodiment invention respectively, and have the same functions as in the first embodiment of the invention respectively. Accordingly, the detailed description of those components will not now be repeated.

In the vehicle interior, the temperature of a space in which air flows is lower than the temperature of a space in which air does not flow. Thus, the temperature of the air supplied to the running battery 220 differs depending on the state of selection of the air-conditioning mode. As a result, the battery temperature TB of the running battery 220 may be affected.

For example, when the outside air introduction mode is selected, the air supplied from the air-conditioning device reaches a hatched region above the intake duct 334 in FIG. 2, as indicated by a solid line of FIG. 2. On the other hand, when the inside air circulation mode is selected, the air supplied from the air-conditioning device flows downward before reaching the hatched region above the intake duct 334 in FIG. 2, as indicated by a broken line of FIG. 2. Thus, while air flows to the intake duct 334 in the case where the outside air introduction mode is selected, air does not flow to the intake duct 334 in the case where the inside air circulation mode is selected.

Thus, in the hybrid vehicle 10 according to this embodiment of the invention, the battery temperature TB tends to be higher when the inside air circulation mode is selected than when the outside air introduction mode is selected.

Thus, in this embodiment of the invention, the ECU 300 determines the target value SOC(1) on the basis of a selection history of the inside air circulation mode when the catalyst temperature TC of the engine 120 is higher than the threshold TC(0).

Figure 12:
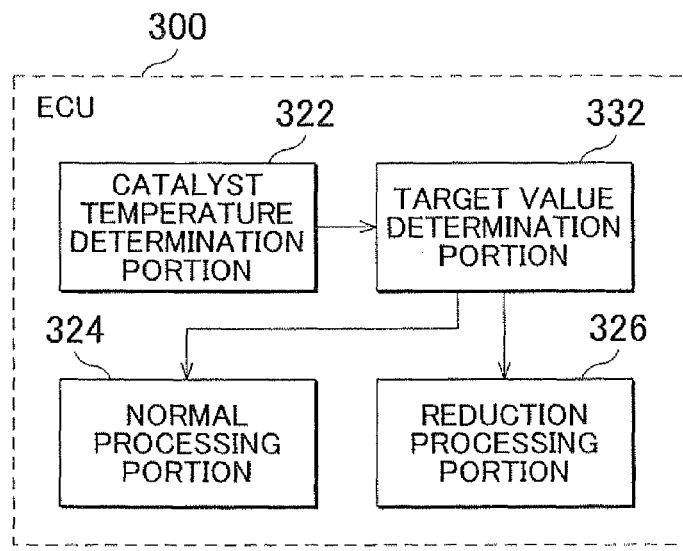
FIG. 12 is a functional block diagram of an ECU as a vehicular control apparatus according to the fourth embodiment of the invention.

FIG. 12 shows a functional block diagram of the ECU 300 as the vehicular control apparatus according to this embodiment of the invention. It should be noted that the functional block diagram of the ECU 300 shown in FIG. 12 is different from the functional block diagram of the ECU 300 shown in FIG. 3 in the inclusion of a target value determination portion 332 and the operations of some functional blocks which will be described below. The functional block diagram of the ECU 300 in this embodiment of the invention is identical to the functional block diagram of the ECU 300 described in the foregoing first embodiment of the invention in other configurational details and other operational details. Thus, the description of such details will not now be repeated.

The target value determination portion 332 determines the target value SOC(2) on the basis of a selection state of the air-conditioning mode of the hybrid vehicle 10. In this embodiment of the invention, the target value determination portion 332 determines the target value SOC(2) on the basis of the selection history of the inside air circulation mode.

The target value determination portion 332 calculates, for example, a frequency (a period) with which the inside air circulation mode is selected in a predetermined period. The target value determination portion 332 determines the target value SOC(2) on the basis of the calculated frequency. For example, the target value determination portion 332 may determine the target value SOC(2) on the basis of the calculated frequency and a predetermined map showing a relationship between the frequency and the target value. In this embodiment of the invention, the target value determination portion 332 determines the target value SOC(2) as a value that decreases as the calculated frequency increases.

The reduction processing portion 326 controls the charge/discharge of the running battery 220 such that the SOC of the running battery becomes equal to the target value SOC(2) determined by the target value determination portion 332 when the catalyst temperature TC is higher than the threshold TC(0).

In this embodiment of the invention, the catalyst temperature determination portion 322, the normal processing portion 324, the reduction processing portion 326, and the target value determination portion 332 are all described as functioning as pieces of software realized through the execution of the program stored in the memory by the CPU of the ECU 300. However, these portions may also be realized by pieces of hardware. It should be noted that this program is recorded in a recording medium which is mounted on the vehicle.

Figure 13:
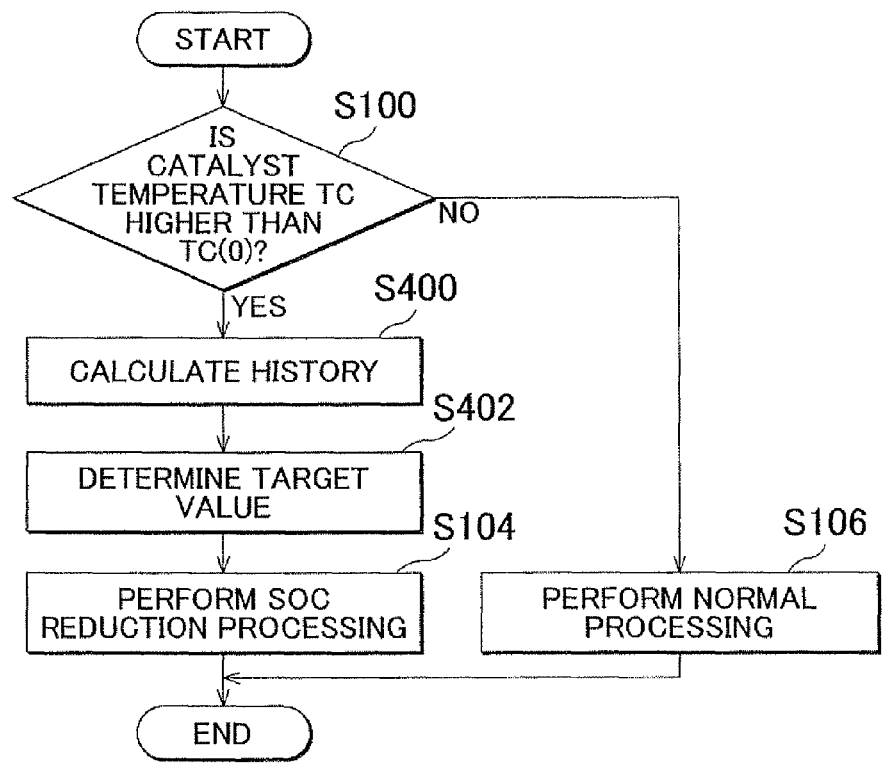
FIG. 13 is a flowchart showing a control structure of a program executed by the ECU as the vehicular control apparatus according to the fourth embodiment of the invention.

Referring to FIG. 13, a control structure of the program executed by the ECU 300 as the vehicular control apparatus according to this embodiment of the invention will be described.

It should be noted in the flowchart shown in FIG. 13 that each processing identical to that of the foregoing flowchart shown in FIG. 4 is denoted by the same step number as in FIG. 4, and is identical in the processing contents to that of FIG. 4 as well. Accordingly, the detailed description of such steps will not now be repeated.

When the catalyst temperature TC is higher than the threshold TC(0) (YES in S100), the ECU 300 calculates a selection history of the inside air circulation mode in S400. In S402, the ECU 300 determines the target value SOC(2) on the basis of the calculated selection history.

The operation of the ECU 300 as the vehicular control apparatus according to this embodiment of the invention, which is based on the foregoing structure and the foregoing flowchart, will be described.

When the catalyst temperature TC of the hybrid vehicle 10 is equal to or lower than the threshold TC(0) (NO in S100), the normal processing is performed (S104). That is, the ECU 300 controls the charge/discharge of the running battery 220 such that the SOC of the running battery 220 becomes equal to the target value SOC(1).

As a result of controlling the charge/discharge of the running battery 220 such that the SOC of the running battery 220 becomes equal to the target value SOC(1), the SOC of the running battery 220 changes in such a manner as to increase/decrease around the target value SOC(1).

When the hybrid vehicle 10 continues to run at high loads, for example, to run uphill during the operation of the engine 120, the catalyst temperature TC rises with the passage of time. As a result, when the catalyst temperature TC is higher than the threshold TC(0) (YES in S100), a selection history of the inside air circulation mode is calculated (S400). When the target value SOC(2) is determined on the basis of the calculated selection history (S402), the SOC reduction processing is performed (S102). That is, the ECU 300 controls the charge/discharge of the running battery 220 such that the SOC of the running battery 220 becomes equal to the determined target value SOC(2).

As described in the foregoing first embodiment of the invention, the SOC and the battery temperature TB tend to be lower in the case where the reduction processing is performed than in the case where the normal processing is performed.

By thus reducing the SOC or the battery temperature TB before the temperature of the three-way catalytic converter 124B becomes high, the charge power upper limit Win is restrained from decreasing due to an increase in the SOC or the battery temperature TB at the time when the catalyst is at high temperatures. Thus, in the running battery 220, when the catalyst is at high temperatures, the charge of the running battery 220 through regenerative braking is likely to be accepted (regenerative braking is unlikely to be limited). As a result, the frequency of the performance of fuel cut control for the engine 120 decreases.

As described above, the vehicular control apparatus according to this embodiment of the invention achieves the following operation and effect in addition to the operations and effects of the vehicular control apparatus according to the foregoing first embodiment of the invention.

When the charge power upper limit Win decreases due to the high frequency of the selection of the inside air circulation mode (i.e., the high battery temperature TB), there arises a situation in which the charge through regenerative braking is unlikely to be accepted. Thus, under this situation, the SOC reduction processing is performed when the catalyst temperature TC is higher than the threshold TC(0), so that the SOC of the running battery 220 can be reduced more than in the case where the normal processing is performed, and the battery temperature TB can be restrained from rising. Thus, regenerative braking is unlikely to be limited. As a result, the frequency of the performance of fuel cut control for the engine 120 can be reduced.

In this embodiment of the invention, the target value determination portion 332 has been described as determining the target value SOC(2) as a value that decreases as the calculated frequency increases. However, the invention is not limited to this case in particular. For example, the target value determination portion 332 may determine the target value SOC(2) as a predetermined value when the calculated frequency is higher than a threshold, and may determine the target value SOC(2) as the target value SOC(1) during the performance of the normal processing when the calculated frequency is equal to or lower than the threshold.

Further, the target value determination portion 332 may determine the target value SOC(2) as a value that decreases as the calculated frequency decreases (i.e., as the frequency of selection of the outside air introduction mode increases) when the battery temperature TB tends to be higher in the case where the outside air introduction mode is selected than in the case where the inside air circulation mode is selected. At this moment, the target value determinination portion 332 may determine the target value SOC(2) on the basis of the intake air temperature TA in addition to or in place of the frequency of selection of the inside air circulation mode. This is because the intake air temperature TA indicates an outside air temperature and may affect the battery temperature TB when outside air is introduced. For example, the target value determination portion 332 may determine the target value SOC(2) as a value that decreases as the average of the intake air temperature TA increases.

The embodiments of the invention disclosed this time should be considered to be exemplary in all respects and nonrestrictive. The scope of the invention is defined not by the foregoing description but by the claims, and the invention is intended to encompass all modifications that are equivalent in significance and scope to the claims.

What is claimed is:

1. A vehicular control apparatus mounted on a vehicle including an internal combustion engine, a rotating electrical machine, and a storage device that is supplied with a power from the rotating electrical machine, wherein
the vehicle can be decelerated through stoppage of injection of fuel into the internal combustion engine and regenerative braking by the rotating electrical machine,
the vehicular control apparatus controls the vehicle such that a remaining capacity of the storage device becomes equal to a first target value when a temperature of a catalyst of the internal combustion engine is higher than a first threshold, and that the remaining capacity of the storage device becomes equal to a second target value when the temperature of the catalyst is equal to or lower than the first threshold,
the first target value is lower than the second target value, and
the first threshold is a predetermined value lower than a temperature at which a performance of the catalyst deteriorates due to a promotion of a deterioration in the catalyst when the stoppage of the injection is performed.

2. The vehicular control apparatus according to claim 1, wherein
the vehicle includes an air-conditioning device capable of selecting one of an outside air introduction mode and an inside air circulation mode as an air-conditioning mode, and
the storage device is cooled using air in an interior of the vehicle, and
the vehicular control apparatus determines the first target value on a basis of a selection history of the inside air circulation mode when the temperature of the catalyst is higher than the first threshold.

3. The vehicular control apparatus according to claim 2, wherein the vehicular control apparatus determines the first target value as a value that decreases as a frequency of selection of the inside air circulation mode increases, when the temperature of the catalyst is higher than the first threshold.

4. The vehicular control apparatus according to claim 1, wherein the vehicular control apparatus controls the storage device such that the remaining capacity becomes equal to the first target value when a temperature of the storage device is higher than a second threshold, in a case where the temperature of the catalyst is higher than the first threshold.

5. The vehicular control apparatus according to claim 1, wherein the vehicular control apparatus controls the vehicle such that the remaining capacity in the storage device becomes lower when a temperature of an interior of the vehicle is high than when the temperature of the interior of the vehicle is low.

6. A vehicular control method applied to a vehicle including an internal combustion engine, a rotating electrical machine, and a storage device that is supplied with a power from the rotating electrical machine, wherein
the vehicle can be decelerated through stoppage of injection of fuel into the internal combustion engine and regenerative braking by the rotating electrical machine, and
the vehicular control method includes:
a step of acquiring a temperature of the catalyst of the internal combustion engine,
a step of controlling the vehicle such that a remaining capacity in the storage device becomes equal to a first target value when the temperature of the catalyst of the internal combustion engine is higher than a first threshold; and
a step of controlling the vehicle such that the remaining capacity of the storage device becomes equal to a second target value when the temperature of the catalyst is equal to or lower than the first threshold:
the first target value is lower than the second target value, and
the first threshold is a predetermined value lower than a temperature at which a performance of the catalyst deteriorates due to a promotion of a deterioration in the catalyst when the stoppage of the injection is performed.

* * * * *